(12) United States Patent
Nahlous et al.

(10) Patent No.: US 9,319,240 B2
(45) Date of Patent: Apr. 19, 2016

(54) ETHERNET RING PROTECTION NODE

(71) Applicant: Ciena Corporation, Hanover, MD (US)

(72) Inventors: Paul Simon Nahlous, San Anselmo, CA (US); Balaji Subramaniam, Rohnert Park, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/035,035

(22) Filed: Sep. 24, 2013

(65) Prior Publication Data

US 2015/0085637 A1     Mar. 26, 2015

(51) Int. Cl.
| | |
|---|---|
| *H04J 1/16* | (2006.01) |
| *H04L 12/437* | (2006.01) |
| *H04L 12/24* | (2006.01) |
| *H04L 12/705* | (2013.01) |
| *H04L 12/707* | (2013.01) |
| *H04L 12/703* | (2013.01) |
| *H04L 12/26* | (2006.01) |

(52) U.S. Cl.
CPC .......... *H04L 12/437* (2013.01); *H04L 41/0668* (2013.01); *H04L 45/18* (2013.01); *H04L 45/22* (2013.01); *H04L 45/28* (2013.01); *H04L 41/0672* (2013.01); *H04L 41/0816* (2013.01); *H04L 43/0811* (2013.01)

(58) Field of Classification Search
CPC .............. H04L 12/437; H04L 12/5612; H04L 12/5627; H04L 41/0668; H04L 41/0672; H04L 41/9677; H04L 45/28

USPC ......................................... 370/216–235, 258
See application file for complete search history.

(56) References Cited

U.S. PATENT DOCUMENTS

| | | | |
|---|---|---|---|
| 2003/0206548 A1* | 11/2003 | Bannai et al. .................. | 370/389 |
| 2009/0257348 A1* | 10/2009 | Stokes et al. .................. | 370/228 |
| 2012/0014284 A1 | 1/2012 | Ranganathan | |
| 2012/0243405 A1* | 9/2012 | Holness et al. ............... | 370/225 |
| 2014/0254347 A1* | 9/2014 | Xie et al. ....................... | 370/218 |

* cited by examiner

*Primary Examiner* — Kan Yuen
(74) *Attorney, Agent, or Firm* — Christopher L. Bernard; Lawrence A. Baratta, Jr.; Clements Bernard PLLC

(57) ABSTRACT

Systems and methods are disclosed for providing redundancy in a network node implementing a ring protection protocol. Each of the two ring ports connecting the node to other nodes in a ring supporting the protocol may be maintained by a separate line card. Should one line card fail, traffic passing through the node may be redirected through the remaining ring port under the control of the surviving state machine. The two state machines may be coordinated over the backplane of the node to maintain a common state, making them transparent to other nodes. Additionally, the backplane link between the state machines may be monitored for failures that may be addressed with messages used to respond to general ring failures and by assigning one state machine to block a ring port upon recovery to prevent a loop within the ring until the ring protection link can be blocked.

14 Claims, 10 Drawing Sheets

ETHERNET RING PROTECTION NODE

TECHNICAL FIELD

This invention relates to network nodes and more particularly to systems and methods for nodes supporting data-link-layer, ring-protection-switching protocols.

BACKGROUND

At the data link layer (layer 2 of the Open Systems Interconnection (OSI) model), switching protection protocols, such as the Spanning Tree Protocol (STP), can be used to prevent the formation of loops by blocking node ports. Loops are problematic because they can overwhelm the bandwidth of a network during the flooding process whereby nodes in the network send out requests, which can get repeated ad infinitum in a loop, to find a new destination node with a Media Access Control (MAC) address not previously encountered by a node in the network. When a failure occurs in a network, such switching protection protocols need to be able to respond and restore service.

However, the response time of older switching protection protocols, such as STP, have proved too slow as data-link-layer networks, such as Ethernet networks, have evolved to provide services like video on demand, voice over internet protocol, and internet access. New switching protection protocols have been developed to more quickly respond to failures in the network. Ethernet Ring Protection (ERP) protocols, such as the ERP protocol defined in International Telecommunication Union-Telecommunication Standardization Sector (ITU-T) G. 8032, provide examples of switch protection protocols with dramatically improved recovery times.

Although a node supporting an ERP may have more than two ports into/out of the node, the node can satisfy the ring architecture of an ERP ring by connecting to one or more additional nodes within an ERP ring with two ring ports. Additional ports may connect a node participating in the ring to nodes outside of the ring. Since a ring, by definition results in a loop, ERPs may block a link between a designated pair of nodes to prevent such loops. Despite the blocked link between two nodes, all of the nodes in the ring can still communicate with one another by passing information along the remaining backbone of serviceable links in one direction or another, depending on which is shortest. When a failure occurs elsewhere in the ring, the blocked link can be unblocked, since the failure prevents loops by effectively blocking a new link at a new location. Since the previously blocked link is now unblocked, all the nodes in the ring can still communicate with each other across a new backbone of serviceable links, although the directions in which communications are sent and from which they are received may change do to a new location of a new blocked link.

However, if a node fails completely with respect to the ring, meaning both ring ports go down, even if additional ports to nodes outside the ring remain serviceable, the ring loses two links. With the loss of two links, it is no longer possible to access every node in the ring. Because both ports that connect the failed node to the ring are down, the failed node can no longer communicate with other nodes in the ring and vice versa. What is more, nodes outside the ring connected to the failed node through one or more additional ports, which may not have failed, can no longer communicate with the ring.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

Figure 1:
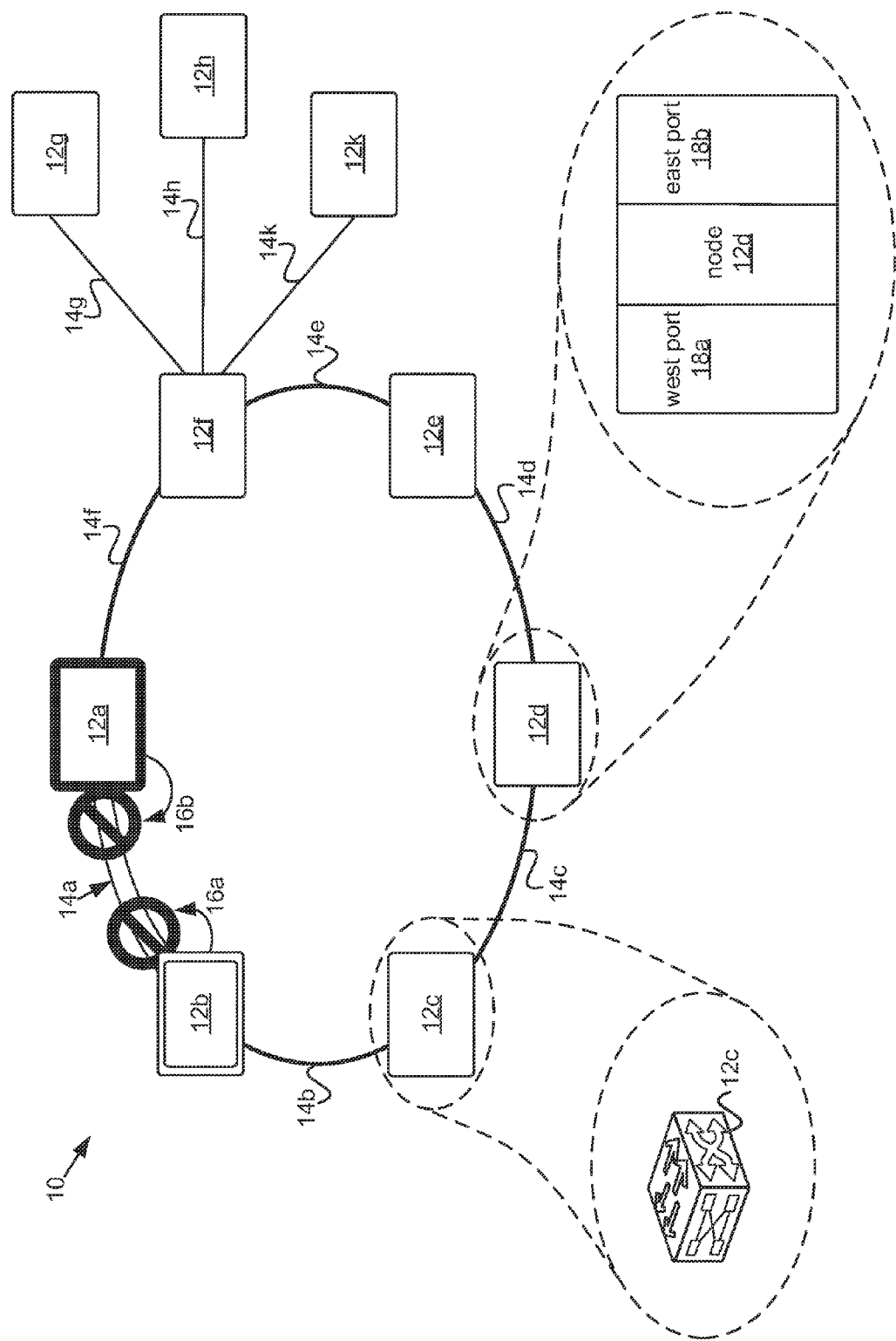
FIG. 1 is a schematic block diagram of a network including a ring architecture on which a ring protection protocol is implemented in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Data-link-layer, ring-protection protocols, such as Ethernet Ring Protection (ERP) protocols may prevent loops, provide greatly improved recovery times in response to network failures, and provide redundancy across their ring architecture by the potential to unblock a ring protection link ordinarily blocked in a default position. Additional redundancy, however, may be provided at the level of individual nodes in the ring architecture. A node participating in a ring architecture may also be networked to large portions of a network external to the ring-architecture portion of the network. The connectivity provided by such a node may be lost where the node fails in the absence of redundancy at the node level to maintain this connectivity.

To preserve the many advantages of a ring protection protocol, node-level redundancy may include more than redundant connections, but may also include redundancies of one or more elements implementing the ring protection protocol, such as state machines. Also, to preserve the protection against loops provided by ring protection protocols, the details implementing node-level redundancy may include measures to prevent loops despite any changes arising from the implementation of node-level redundancies. Additionally, to facilitate integration of such a node into a ring of nodes implementing the ring protection protocol, ideally, details of such redundancies would be transparent at the node level.

A non-limiting, exemplary embodiment may involve implementing a ring-protection-protocol state machine on each of two different line cards residing at a common ring node. A front port of each line card may provide/maintain one ring port of the two ring ports defined for a ring node by the ring protection protocol. Therefore, if one ring card and/or state machine goes dark a surviving state machine may provide redundant connectivity, and a surviving state machine may provide redundant implementation of the ring protection protocol at the node.

To make the multiple state machines transparent, the multiple state machines may be synchronized as one logical state machine. For example, the first ring-protection-protocol state machine on a first line card of the two line cards may be updated to an updated state. A message may then be passed from a first virtual port of the first line card over a backplane of the ring node to a second virtual port of the second line card. The second ring-protection-protocol state machine on the second line card of the two line cards may then also be updated to the updated state in response to the message received at the second virtual port. As a result, the first state machine and the second state machine are synchronized as a common virtual state machine with respect to the ring node.

Messages used generally by the ring protection protocol to update the state of nodes in a ring implementing the ring protection protocol may be passed over the backplane to also synchronize multiple state machines at a common node providing the backplane. This backplane link may be monitored for failure. A failure may be addressed with messages used to respond to general ring failures. Furthermore, different roles may be assigned to the different state machines to respond to a recovery of the previously-failed backplane link between the state machines to prevent a loop. For example, while a ring protection link may remain unblocked in response to failure messages sent in response to the failure of the backplane link, one state machine may be assigned to block one of the ring ports of the redundant node to prevent a loop. This ring port may not be unblocked until an indication is received that the ring protection link is again blocked, according to the rings default posture, to prevent another potential loop.

Furthermore, state machines may be modified to respond to messages even though the messages may have a common identification node value, indicative that the message may have run their course and may be returning to their originator. State machines may be modified to respond to such matching messages where such messages are received over a virtual port, as opposed to a ring port, indicative of the messages originating with a paired sate machine and containing synchronization information. Further details of approaches to achieving node-level redundancy can be informed by networking and ring protection protocol considerations discussed below with respect to FIG. 1.

Referring to FIG. 1, a ring architecture 10 is depicted with multiple nodes 12a-f participating in the ring architecture 10. Additional nodes 12g-k may participate in a network with the multiple nodes 12a-f of the ring architecture 10. The network can be a data-layer network (layer 2 of the Open Systems Interconnection (OSI) model), such as, but not necessarily, an Ethernet network. As demonstrated by the focused view of the third node 12c, individual nodes may be instances of various forms of switches 12c. Such switches may be classified according to different categories. For example, a group of switches 12 may be categorized as access switches 12. Another group may be categorized as aggregation switches 12.

Nodes 12 may be connected one to another by links 14a-k. By way of example and not limitation, one or more of such links 14a-f between nodes 12a-12f in the ring 10 may be Network-to-Network Interfaces (NNI). The links 14a-k used to form the ring architecture 10 may be bi-directional links. Also, the links 14g-k between a node 12f participating in the ring 10 and nodes outside of the ring 12g-k may include one or more NNIs and/or User-to-Network Interfaces (UNIs).

The multiple nodes 12a-f in the ring 10 may implement a ring protection protocol, such as an ERP protocol. Although the ring 10 is made up of six nodes 12a-f in FIG. 1, many different numbers of nodes 12 may be involved. One, non-limiting example of a ring protection protocol may be found in ITU-T G.8032, but other ring protection protocols are possible. As can be appreciated, the ring structure 10 resulting from the six links 14a-f between the six nodes 12a-f can provide redundancy. At the same time, the ring structure 10 may also result in a problematic loop.

To prevent formation of a loop, a ring protection protocol may designate a particular link 14a as a Ring Protection Link (RPL) 14a. Although the first 12a and the second nodes 12b may maintain the RPL 14a, the first 12a and the second nodes 12b may also block 16a, 16b the RPL 14a to prevent a loop from forming within the ring 10. In other words, by maintaining the blocked 16 RPL 14a, redundancy may be preserved. By blocking 16 the RPL 14a, a loop can be prevented.

In the event of a failure at any other link 14a-f, the first 12a and the second nodes 12b may remove the blocks 16a, 16b to the RPL 14a. Once the blocks 16a, 16b have been removed from the RPL 14a any node 12a-f on the ring 10 can still be accessed across a C-shaped backbone even though one of the remaining links 14b-f is temporarily down. When the downed link 14 recovers, the first 12a and the second nodes 12b may again block 16a, 16b the RPL 14a to prevent a loop.

Although the RPL 14a may have two adjacent nodes 12a, 12b, to avoid confusion, the ring protection protocol may designate one node 12a as an Owner RPL (ORPL) node 12a. In FIG. 1, the ORPL node 12a is indicated by the bold border outline. Specific functions related to blocking 16a and unblocking and/or initiating the blocking 16 and/or unblocking of the RPL 14a may be assigned and performed on the basis of a node's 12a status as an ORPL node 12a.

Similarly, specific functions related to blocking 16b and unblocking and/or coordinating the blocking 16 and unblocking of the RPL 14a may be assigned and performed on the basis of a node's 12b status as an RPL-neighbor node 12b. In FIG. 1, an example RPL-neighbor node 12b is indicated by the double-lined border outline. Therefore, in some examples, implementation of a ring protection protocol may involve referencing a position of a node 12 relative to the RPL 14a in the ring 10.

As indicated by the exploded view of the fourth node 12d, two ring ports 18a, 18b may be defined for ring nodes 12a-12f supporting the ring protection protocol. One ring port may be referred to as a west port 18a, and another ring port may be referred to as an east port 18b. The west port 18a and the east port 18b of each node 12a-f are sufficient to link the nodes 12a-f together in a ring structure 10. Additional ports may connect a ring node 12f to client nodes 12g-k external to the ring 10.

Figure 2A:
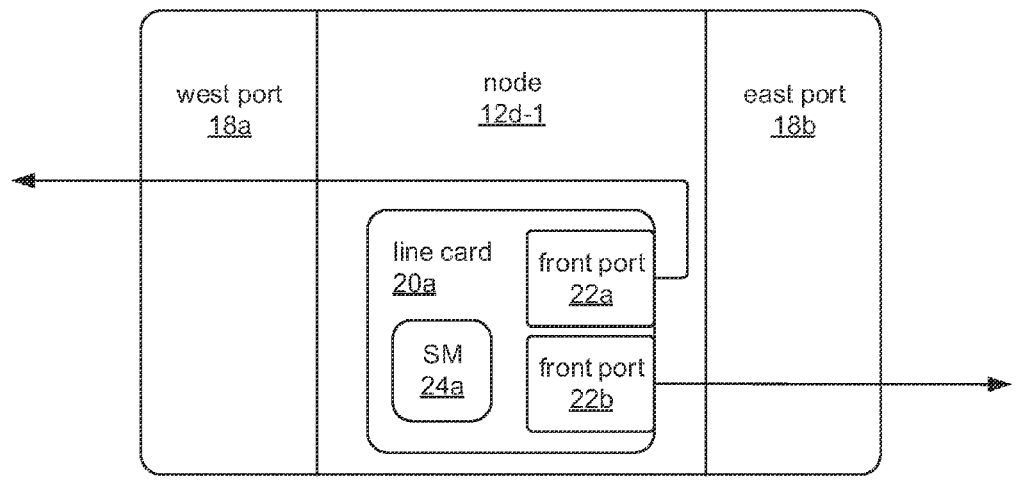
FIG. 2a is a schematic block diagram of ring node implementing a single, ring-protection state machine in accordance with prior art.

Referring to FIG. 2a, a ring node 12d-1 is provisioned with a single line card 20a. The line card 20a may have at least two front ports 22a, 22b. The line card 20a may maintain the west port 18a of the ring node 12d-1 over the first front port 22a and the east port 18b over the second front port 22b. In addition, a state machine 24a may reside on the line card 20a. The state machine 20a may increment its state in response to one or more messages about relevant events occurring in the ring 10 received over the west port 18a and/or the east port 18b and/or events occurring locally with respect to the ring node 12d-1. Throughout this application, the term 'line card' can refer to hardware commonly referred to as a line card, but may also refer to other forms of infrastructure capable of maintaining a ring port 18 and/or a state machine 24 and vice versa.

The state machine 24a may perform such state-dependent actions as sending and responding to messages to coordinate implementation of the ring protection protocol. Additional actions may include blocking 16 and unblocking ports to prevent loops and insure that communication between nodes 12a-f in the ring 10 is preserved. The state machine 24a may also perform additional actions related to the implementation of the ring protection protocol.

However, since both the west port 18a and the east port 18b are maintained by the line card 20a, a failure at the line card 20a results in a complete failure of the node 12d-1. As discussed above, any traffic from the ring 10 to client nodes 12 external to the ring 10 that passes through the ring node 12d-1 will be stymied, as will any traffic from the external, client nodes 12 to the ring 10 because the ring node 12d-1 no longer has a port 18 connected to the ring. Additionally, all ring protection protocol functions implemented by the state machine 24a will be lost with the line card 20a on which the state machine 24a is implemented. Therefore, additional measures are desirable to achieve node-level redundancy.

Figure 2B:
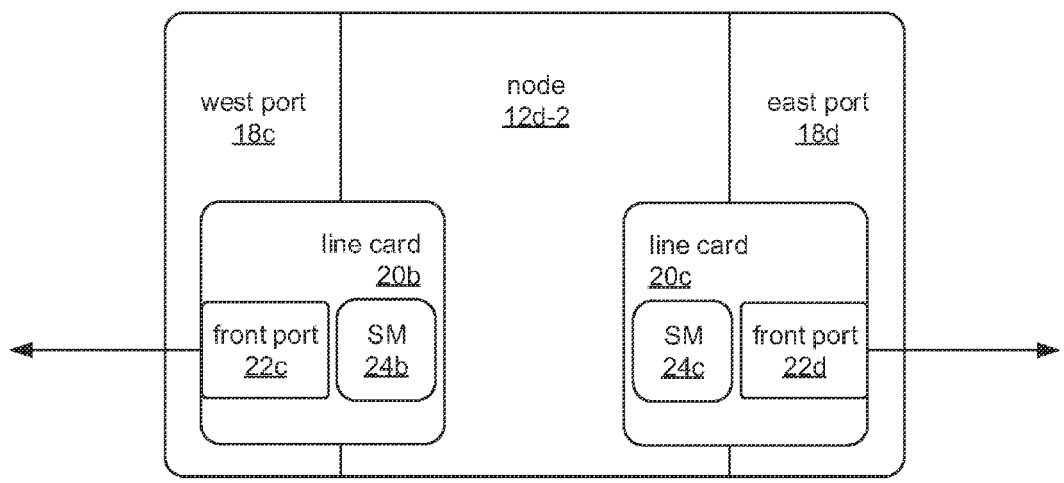
FIG. 2b is a schematic block diagram of a ring node whose two ring ports are each maintained by a separate line card with its own ring-protection state machine, in accordance with an embodiment of the present invention.

Referring to FIG. 2b, a redundant ring node 12d-2 capable of node-level redundancy is depicted. The ring node 12d-2 may include two line cards 20b, 20c, as opposed to the single line card in FIG. 2a. The first line card 20b and the second line card 20c may be used to implement the ring node 12d-2. The first line card 20b may include a first front port 22c and a first state machine 24b. Similarly, the second line card 20d may include a second front port 22d and a second state machine 24c. The depiction of two line cards 20 and two state machines 24 does not limit the principles discussed herein from being applied to ring nodes 12 with greater numbers of line cards and/or state machines 24, as indicated by the use of such terms as 'multiple state machines.'

Additionally, each ring port 18c, 18d may be maintained by a separate line card 20b, 20c. Thus, the first front port 22c of the first line card 20b may serve as the first ring port 18c. Similarly, the second front port 22d of the second line card 20c may serve as the second ring port 18d. In FIG. 2b, the first line card 20b, first front port 22c, and first state machine 24b may be associated with the west port 18a, and the second line card 20c, second front port 22d, and second state machine 24c may be associated with the east port 18b. However, these assignments may be reversed for purposes of interpreting the claims.

The first state machine 24b and/or the second state machine 24c may implement state machines consistent with a ring protection protocol, such as an ERP protocol. Since a separate line card 20b/20c maintains each of the individual ports 18c/18d, if one of the two line cards 20b, 20c goes dark, or fails, in part or entirely, traffic on the ring 10 may be redirected to the ring node 12d-2 through the remaining line card 20b/20c. Additionally, if one of the two line cards 20b, 20c fails, even if the failure only shuts down the corresponding state machine 24b/24c on that line card 20b/20c, a second, redundant state machine 24b/24c survives to allow the ring node 12d-2 to continue to participate in the implementation of the ring protection protocol. As discussed with respect to FIG. 3 below, this redundancy not only provides node-level redundancy in terms of the ring node's participation in the ring 10, but also in terms of the connections between the ring 10 and external client nodes 12g-k through the ring node 12d-2.

Figure 3:
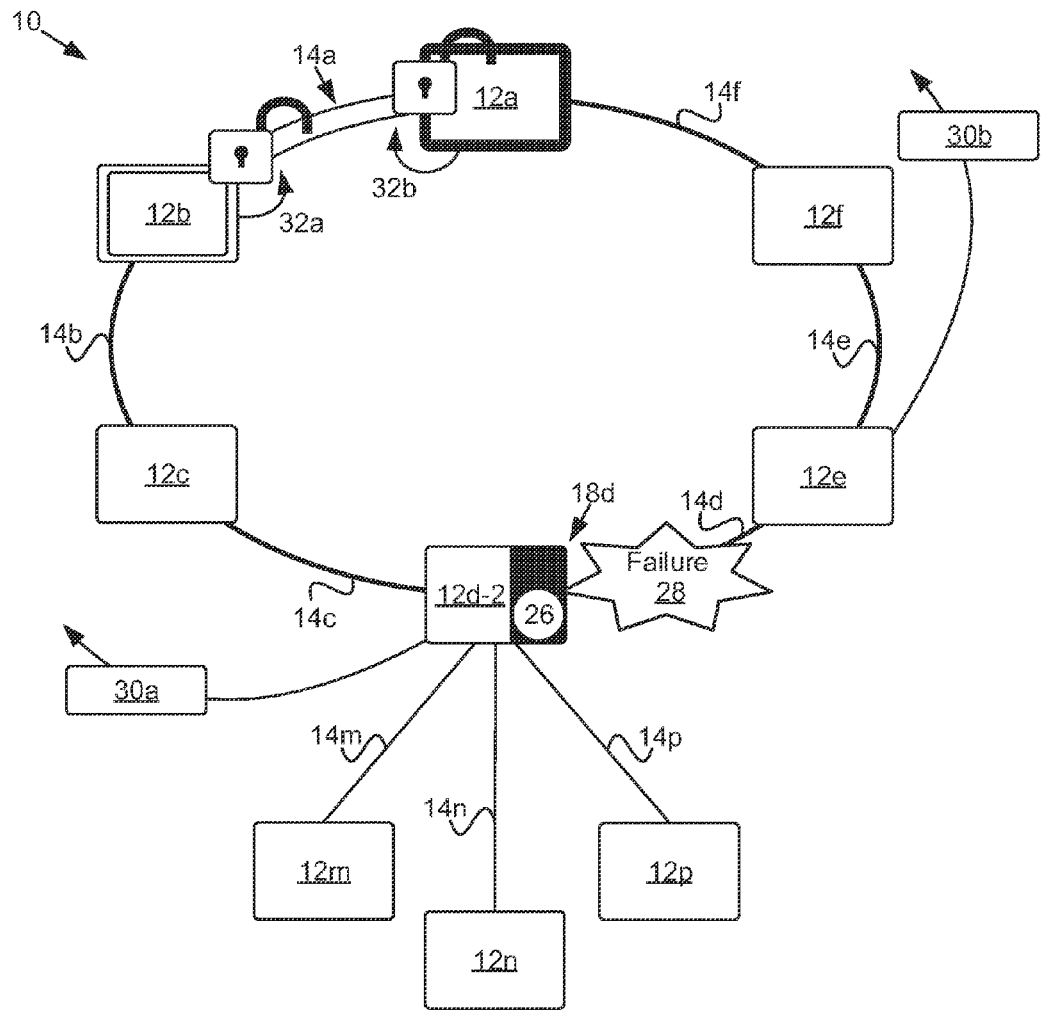
FIG. 3 is a schematic block diagram of a ring node within a ring implementing a ring protection protocol where one of the ring node's ring ports has failed, but which still provides access to nodes external to the ring through the remaining ring port under the control of a surviving state machine, in accordance with an embodiment of the present invention.

Referring to FIG. 3, a ring architecture 10 is depicted with a ring node 12d-2 implemented using redundant line cards 20b, 20c and redundant state machines 24b, 24c similar to the ring node 12d-2 depicted in FIG. 2b. However, one of the line cards 20c has gone dark, or failed 26, causing the east ring port 18d to fail. Consequently, the fourth link 14d between the fourth line card 12d and the fifth line card 12e goes down 28.

In accordance with the ring protection protocol, the fourth ring node 12d and/or the fifth ring node 12e may send out a failure message 30a, 30b over the third link 14c and/or the fifth link 14e. The failure message(s) 30a, 30b may be relayed to an ORPL node 12a and/or RPL-neighbor node 12b which can respond to the failure message(s) 30a, 30b by unblocking 32a, 32b the RPL 14a. In some, but not necessarily all, examples, the unblocking 32a, 32b of the RPL 14a may be coordinated by an ORPL node 12a. In examples where the ring 10 implements a ring protection protocol consistent with the ring Ethernet protection switching protocol(s) defined by ITU-T G.8032, the failure message(s) 30a, 30b may be one or more Ring-Automatic Protection Switching (R-APS) Signal Failure (SF) messages, or R-APS(SF) messages. In some examples, the failure message(s) 30a, 30b may be repeated periodically while the fourth link 14d remains down.

Although the directions in which traffic is sent from the various nodes 12a-f in the ring 10 may change once the RPL 14a is unblocked 32, any node 12a-f in the ring 10 may communicate with any other node 12a-f in the ring 10 despite the failure 28 that makes the fourth link 14d unusable. Furthermore, the additional line card 20b used to maintain the west ring port 18c may allow traffic to continue between the ring 10 and external client nodes 12m-12p with additional links 14m-p to the ring node 12d-2 at which one of the line cards 20c has gone dark 26.

For example, traffic previously passing through a ring port 18c of the ring node 12d-2 maintained by a failed line card 20c may be redirected to pass through a remaining ring port 18c of the two ring ports 18b, 18c defined for the ring node 12d-2. The remaining ring port 18c may be maintained by the surviving line card 20b. The redirected traffic may then pass across the backplane of the ring node 12d-2 and out one or more additional front ports of the ring node 12d-2 to one or more client nodes 12m-p external to the ring of nodes 12a-f to which the ring node 12d-2 pertains.

Although the failure 26 at one line card 20c may have resulted in the loss of one state machine 24c, the surviving state machine 24b may insure that the ring node 12d-2 and the traffic surviving thereon proceeds under ring protection control provided by the surviving state machine 24b residing on the surviving line card 20b. As can be appreciated, traffic may also flow from one or more external client nodes 12m-p to the ring 10 across the ring node 12d-2 in the opposite direction. As can also be appreciated, the discussions about a failure 26 at a line card 20c maintaining the east ring port 18d are equally applicable to a scenario where the failure 26 occurs at a line card 20b maintaining the west ring port 18c.

Hence, by including a separate state machine 24 for each ring port 18 with a separate state machine 24, node-level redundancy may be achieved for traffic at the node 12d-2 and ring-protection-protocol controls at that line card 20. Additional details about how traffic may be passed from a surviving ring port 18c to one or more external client nodes 12m-p is provided with respect to FIG. 4. Additionally, with respect to FIG. 4 a consideration begins of approaches to addressing the implications of introducing a second state machine 24 to a single ring node 12d-2.

Figure 4:
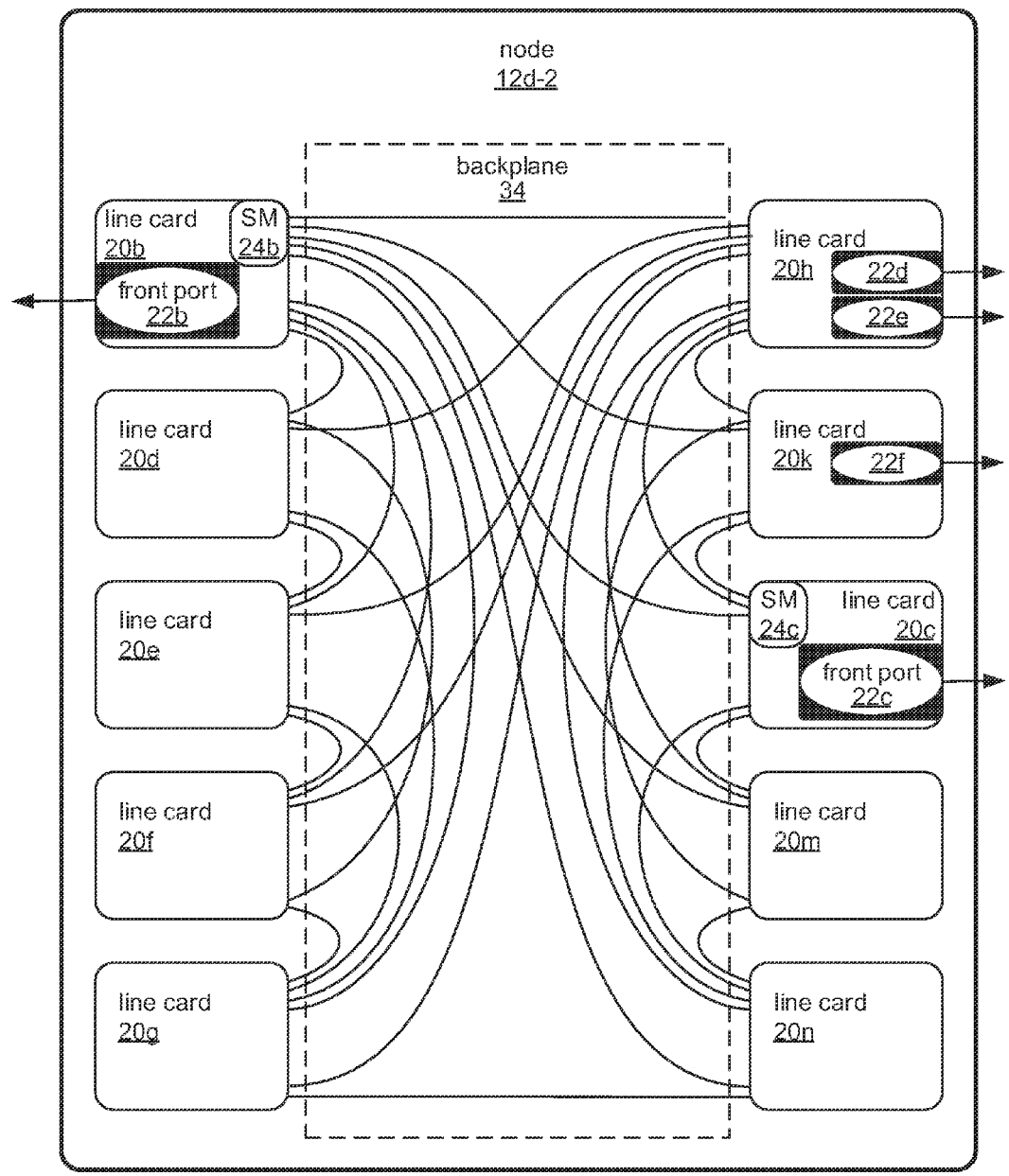
FIG. 4 is a schematic block diagram of a backplane providing communication infrastructure between line cards residing at a common ring node and between two state machines on two such line cards, in accordance with an embodiment of the present invention.

Referring to FIG. 4, a ring node 12d-2 is depicted with multiple line cards 20b-n and a backplane 34. The backplane 34 may provide communication infrastructure between multiple line cards 20b-20n residing at the ring node 12d-2. By way of example and not limitation, a backplane 34 may be switch fabric. However, any number of technologies for supporting communications between line cards 20 are possible. Where the backplane 34 comprises a switch fabric, the switch fabric may be implemented with any number of switch-fabric architectures, from a crossbar, switch-fabric architecture to a shared-memory, switch-fabric architecture. Although FIG. 4 depicts ten line cards 20b-n, as can be appreciated, any number of line cards 20 are possible. Also, although the backplane 34 in FIG. 4 shows interconnections between all line cards 20b-n, in some examples, the backplane may support communications for a subset of the line cards 20.

As with FIG. 2b, the ring node 12d-2 may include a first state machine 24b residing on a first line card 20b, or infrastructure 20b, maintaining a first ring port 18c, of two ring ports 18 defined for a layer-two, ring-protection protocol, in terms of a first front port 22c on that first line card 20b. Also, the ring node 12d-2 may include a second state machine 24c residing on a second line card 20c, or infrastructure 20c, maintaining the second ring port 18d in terms of a second front port 22d on that second line card 20c. As depicted in FIG. 4, one or more additional line cards 20d-n may also reside at the ring node 12d-2. These additional line cards 20d-n may have one or more additional front ports 22d-f linked to one or more client nodes 12m-p outside of the ring to which the ring node 12d-2 belongs. As can be appreciated, a switch-fabric, or switch-fabric like implementation of the backplane may allow any of the line cards 20b-n residing on the ring node 12d-2 to carry linked state machines 24.

The one or more additional front ports 22d-f may be communicatively coupled to both the first line card 20b and the second line card 20c over the backlink 34. Because the backplane 34 can facilitate communication between either the line card 20b maintaining the west ring port 18b and/or the line card 20c maintaining the east ring port 18c and the additional line cards 20h, 20k port 18b and the additional front ports 22d-f linked to client node(s) 12m-p outside of the ring 10, traffic to and from these client nodes 12m-p may be maintained if a line card 20 maintaining one ring port 18 is lost. Additionally, although not depicted in FIG. 4, any line card 20 with front ports 22 serving as both a ring port 18 and a port 22 connected to client nodes 12 external to the ring 10 may continue to facilitate traffic with the external, client nodes 12 even when the other line card 20 connected to the other ring port 18 fails. In other words, one or more additional ports 22d-f may be communicatively coupled to the first ring port 18c and/or the second ring port 18d over the backplane 34 and also linked to one or more client nodes 12m-p outside of the ring 10 of nodes 12a-f participating in the layer-two, ring-protection protocol.

Also, including multiple state machines 24 on different line cards 20 at a single node 12 may insure that the node 12 may still be relied upon to implement a ring protection protocol for the ring 10 in which the ring node 12 participates after one state machine 24 fails with the line card 20 on which it resides. However, inasmuch as ring protection protocols rely on state machines 24 implemented at individual nodes 12a-f to coordinate and implement ring protection protocols, including multiple state machines 24b, 24c at a single node 12d-2 may result in complications for the ring protection protocol. Furthermore, nodes 12c, 12e adjacent to the node 12d-2 operating the two state machines 24b, 24b, especially if the nodes 12c, 12e originate with some other party, may interact with that ring node 12d-2 as though that ring node 12d-2 ran a single state machine 24, which may result in problems, such as, for example, the possibility of loop generation.

Figure 5:
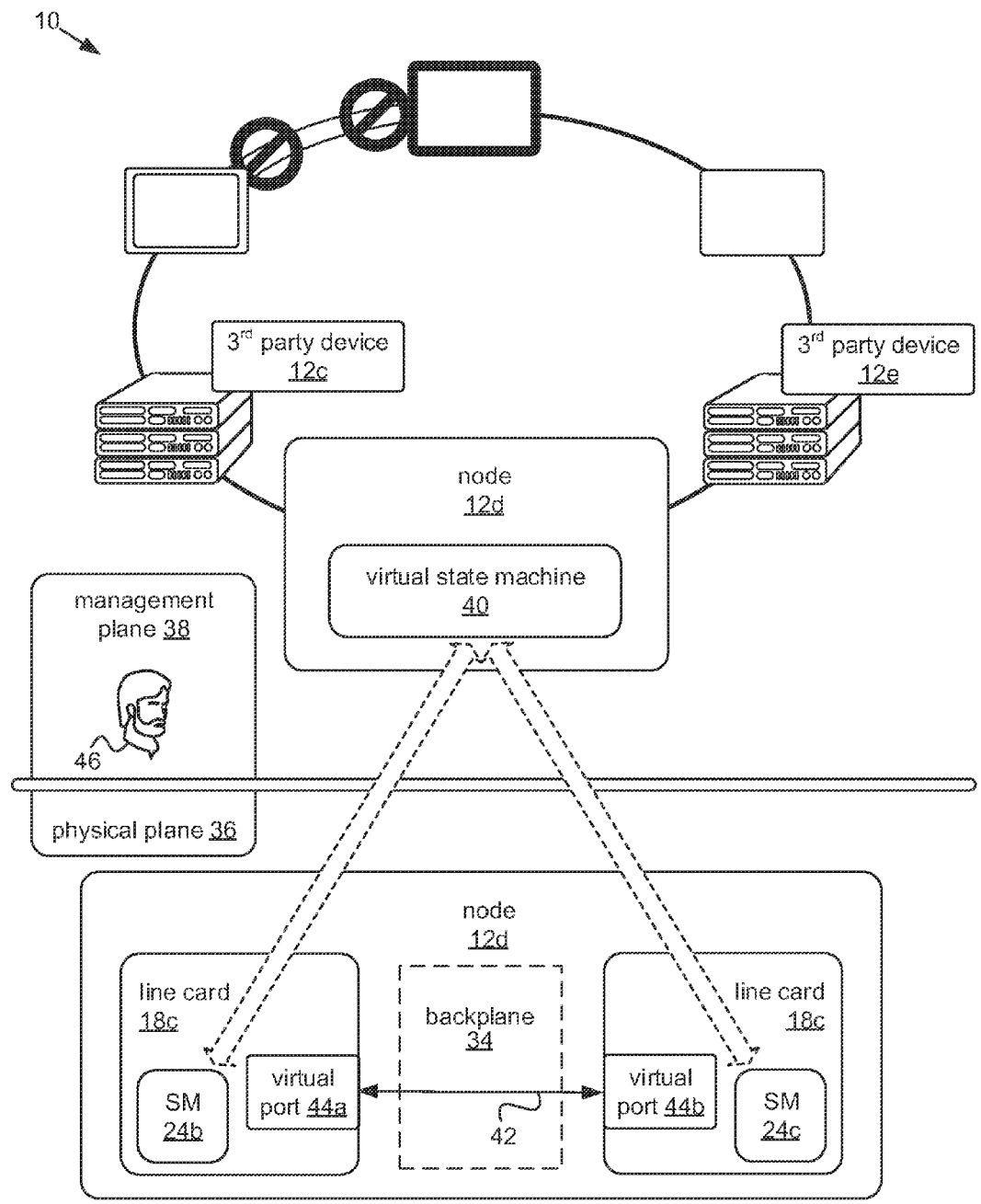
FIG. 5 is a schematic block diagram of two state machines at the physical plane becoming transparent at the management plane for seamless interfaces with third-party devices implementing a ring protection protocol, in accordance with an embodiment of the present invention.

Referring to FIG. 5, a ring node 12d-2 is depicted that, at the physical plane 36, implements multiple state machines 24b, 24c, which, at the management plane 38, may be conflated to a single common, or virtual, state machine 40. An inter-card communication link 42, or intra-node link 42, may be implemented over the backplane 34 between a first virtual port 44a at the first line card 20b and a second virtual port 44b at the second line card 20c. The intra-node link 42, supported by the backplane 34, may be designed to provide a unit of state information to the first state machine 24b and the second state machine 24c so that the first state machine 24b and the second state machine 24c can maintain a common state.

By synchronizing the state of the multiple state machines 24b, 24c over the backplane 34, the multiple state machines 24b, 24c may logically be conflated to a single, common, virtual state machine 40. Because the multiple state machines 24b, 24c may logically be conflated, they may become transparent at the management plane 38. Therefore, a network administrator 46 may be provided with an interface to deal with the ring node 12d-2 with multiple state machines 24b, 24c in the same way as other nodes 12a-c, 12e-f in the ring 10, without any additional rules or considerations.

Furthermore, because the multiple state machines 24b, 24c may become transparent to other nodes 12, including adjacent nodes 12c, 12e, in the ring 10, other nodes 12 may interact with the ring node 12d-2 without making provision for additional considerations. Therefore, one or more of the adjacent nodes 12c, 12e, may be legacy or third-party devices as long as the adjacent nodes 12c, 12e also implement the ring protection protocol of the ring 10. Additional details about implementation of a virtual port 44 are discussed with respect to the following figure, together with modules that may be used to synchronize multiple state machines 24 and avoid potential loops that the multiple state machines 24 may engender.

Figure 6:
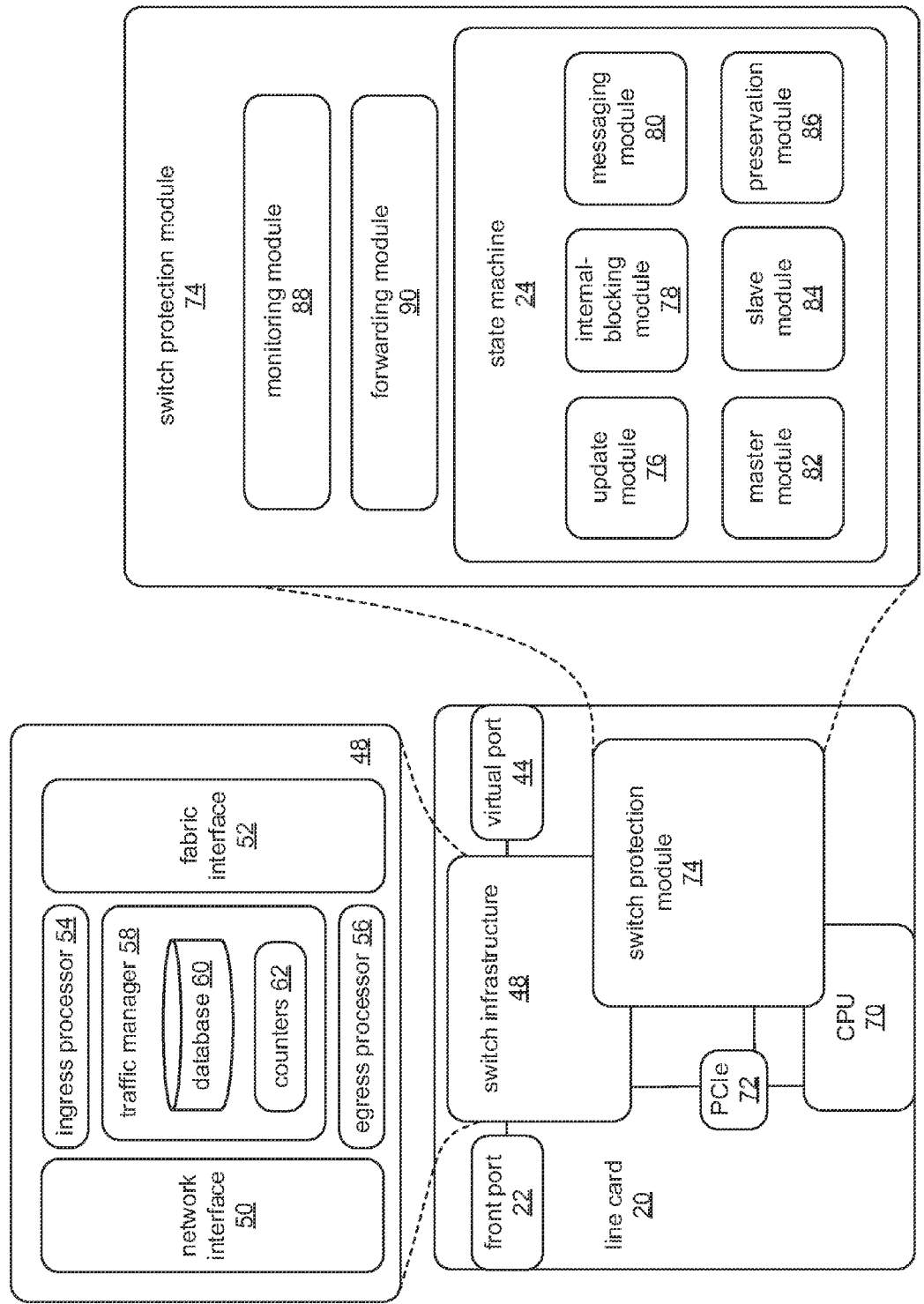
FIG. 6 is a schematic block diagram of a line card maintaining a front port capable of serving as a ring port and a virtual port, with details about switch infrastructure on the line card and a switch protection module with a state machine used to implement a ring protection protocol, in accordance with an embodiment of the present invention.

Referring to FIG. 6, a line card 20 with a front port 22 and a virtual port 44 is depicted. The front port 22 and the virtual port 44 can be connected one to another by switch infrastructure 48. The switching infrastructure 48 may perform the switching functions for the line card 20. By way of example, such operations, which may also be understood in terms of functions, may include interfacing with the network, interfacing with the backplane 34, or switch fabric, packet processing, and/or traffic management.

Receiving and transmitting messages, such as R-APS messages, used to coordinate the implementation of a ring protection protocol within a data-layer network may be accomplished with a network interface 50 for one or more front ports 22 and/or a fabric interface 52 for one or more virtual ports 44. Message, packet, and/or frame, processing may be accomplished, in some embodiments, by means of a separate ingress processor 54 and egress processor 56, which may further be subdivided in terms of transmit and receive operations. The ingress processor 54 may inspect a message as it would data packets/frames and determine a destination MAC address of the message.

The egress processor 56 may encapsulate a message generated at the line card 20 for distribution. Either the ingress processor 54, the egress processor 56, or both may be associated with a buffer. The switching infrastructure 48 may include a traffic manager 58 to direct a message. The traffic manager 58 may include memory storing a database 60, or switch database 60, with learned entries associating different destination MAC addresses with different ports. The database, or switch database 60, with learned entries may store a switch table, MAC table, Content Addressable Memory (CAM) table, or the like. Additionally, the traffic manager 58 may include one or more counters/timers 62 and a scheduler, used to schedule placement of messages on different ports through the network interface 50 and/or the fabric interface 52. The switch infrastructure 48 may be implemented on multiple chips or on a single chip.

Additionally, the line card 20 may include a Central Processing Unit (CPU) 70, a bus 72, such as a Peripheral Component Interconnect Express (PCIe) bus, and a switch protection module 74. The switch protection module 74 may provide infrastructure to implement a ring protection protocol. The functions involved in implementing such a ring protection module may be handled by one or more subsets of modules. With respect to the modules discussed herein, aspects of the present invention may take the form of an entirely hardware embodiment, an entirely software embodiment (including firmware, resident software, micro-code, etc.), or an embodiment combining software and hardware aspects that may all generally be referred to herein as a "module." Furthermore, aspects of the present invention may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Aspects of the switch protection module 74, and possibly all of the switch protection module 74, that are implemented with software may be executed on the CPU 70. Any hardware aspects of the switch protection module 74 may be implemented to interact directly with the switch protection module 74 and/or ports 22, 44.

In some examples, the switch protection module 74 may include a state machine 24. In certain examples, the state machine 24 may subsume the switch protection module 74. In other examples, the switch protection module 74 may embody additional functionalities and or modules. In addition to, or as a part of, the functionalities and/or modules set forth in different ring protection protocols, such as ITU-T G.8032, a state machine 24 and/or a switch protection module 74 may include an update module 76, and internal-blocking module 78, a messaging module 80, a master module 82, a slave module 84, and/or a preservation module 86. Depending on the ring protection protocol, any of the modules may be considered as belonging to a state machine 24, outside the state machine 24 while within a switch protection module 74, or partially within a state machine 24 and partially outside a state machine 24, but within the switch protection module 74. The switch protection module 74 may also include a monitoring module 88 and/or a forwarding module 90, which also may be considered as belonging in whole or in part to a state machine 24. In some examples, a forwarding module 90 may be implemented entirely by the switch infrastructure 48.

As discussed in greater detail below, a master module 82 may be mutually exclusive of a slave module 84 for a single state machine 24, switch protection module 74, and/or line card 20 and vice versa. A master module 82 may address, perform, or coordinate a set of master-role actions 82 explained below by itself or with other modules and/or functionalities. Similarly, a slave module 84 may address, perform, or coordinate a set of slave-role actions 84 explained below by itself or with other modules and/or functionalities. Examples of ways in which master 82 or slave modules 84, together with additional modules discussed above may be used to make multiple state machines 24 transparent and prevent potential loops that the multiple state machines 24 might generate are discussed with respect to the following figures.

Figure 7:
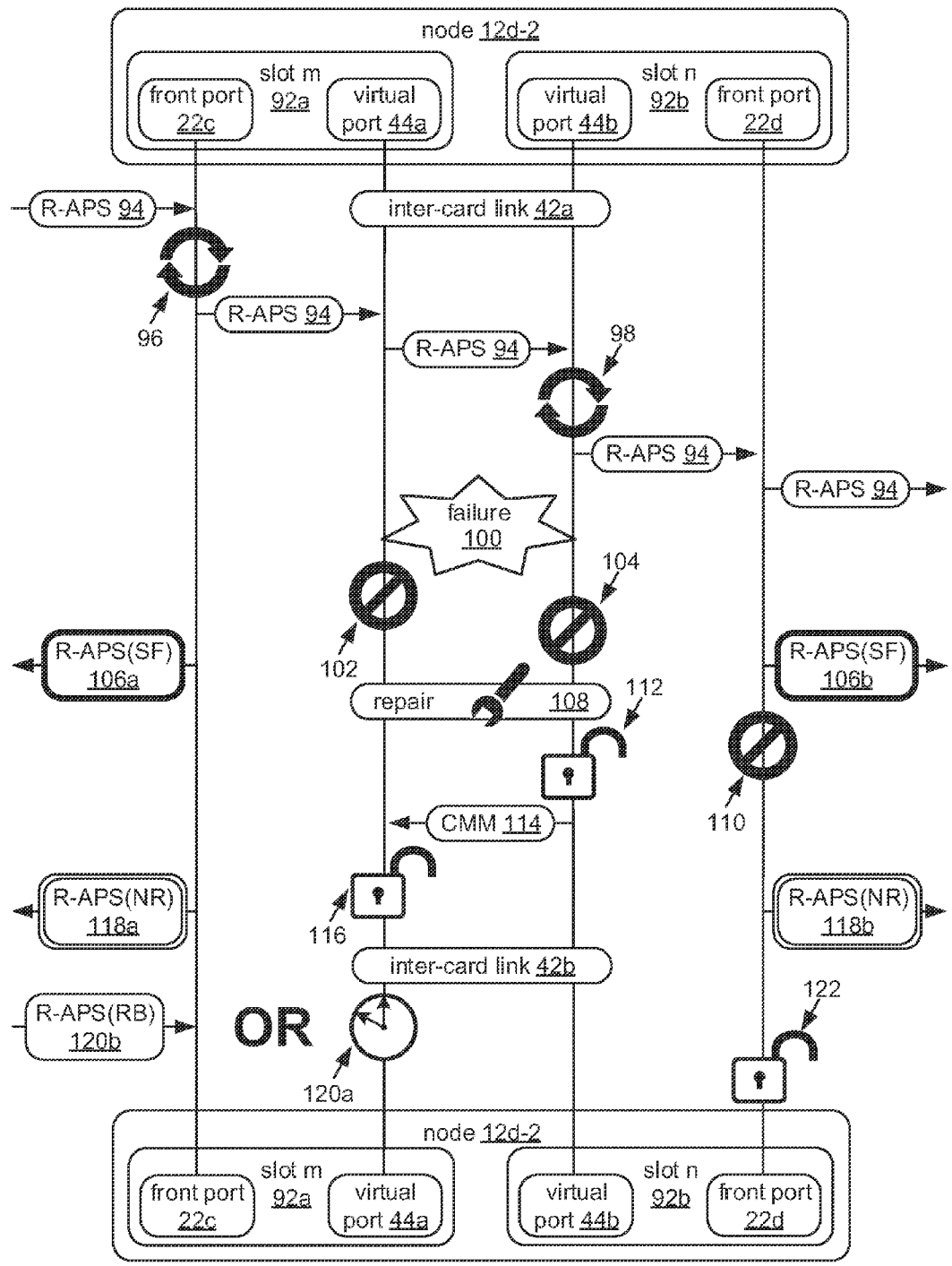
FIG. 7 is a sequence diagram of interactions between a pair of slots on a ring node, each with a front port serving as a ring port, a virtual port, and a state machine to, among other things, (1) synchronize the state machines, (2) respond to failures on a link used to synchronize the state machines, and (3) prevent a loop when the link recovers, in accordance with an embodiment of the present invention.

Referring to FIG. 7, a series of interactions are depicted between a pair of slots 92a, 92b at a ring node 12d-2 to (1) synchronize multiple state machines 24 over an inter-card/ intra-node link 42a. The interactions may also facilitate a (2) response to a failure 100 on the inter-card link 42a, coordinating the unblocking 32 of an RPL 14a, and may (3) prevent a loop from forming upon repair/recovery 108 of the inter-card link 42a until the RPL 14a can be blocked 16 again. Although these interactions are presented sequentially, there may be variations in the order of some actions.

A ring node 12d-2 may include a physical chassis with multiple slots 92, where a slot may receive a line card 20, or control card, for integration into the implementation of the node 12d-2. Each slot 92 may be assigned a letter or number value. For example, a chassis may have sixteen slots 92 (any number of two or more slots 92 are possible) with two slots 92 reserved for control cards and fourteen slots 92 reserved for line cards 20. Slot m 92a and slot n 92b, as depicted in FIG. 7, may correspond to a thirteenth and a fourteenth slot respectively. A line card 20b received by slot m 92a may have a first front port 22c and a first virtual port 44a. Similarly, another line card 20c received by slot n 92n may have a second front port 22d and a second virtual port 44b.

As discussed with respect to FIG. 5, an inter-card/intra-node link 42a may be established between the first virtual port 44a and the second virtual port 44b over the backlink 34. To synchronize multiple state machines 24, a first update module 76a of a first state machine 24b of a first line card 20b may be operable to update the first state machine 24b to an updated state based on a unit of state information. Also, a second update module 76b of a second state machine 24c at a second line card 20c may be operable to update the second state machine 24c to the updated state based on the same unit of state information. The unit of state information may be provided to the two state machines 24b, 24c over the intra-node link 42a. In some examples, the unit of state information may be defined by a proprietary protocol. However, in other examples, the unit of state information may be part of a pre-existing ring protection protocol.

In certain examples, the unit of state information may be a state message 94, such as, without limitation, any of the R-APS messages defined for ITU-T G.3082. In such examples, a state message 94 may arrive at the first ring port 18c. In response to the state message 94, a first update module 76a of the first state machine 24b may update 96 the first state machine 24b according to the ring protection protocol implemented by the ring 10.

A forwarding module 90a residing on the first line card 20b, which may, but need not necessarily, be the switch infrastructure 48a, may forward the state message 94. The state message 94 may be forwarded from the first front port 22b to the first virtual port 44a via the switch infrastructure 48 from the network interface 50 to the fabric interface 52 in a manner similar to any other frame/packet whose route involves the switch fabric 34. The forwarding module 90a may forward the state message 94 through the first virtual port 44a and over the inter-card communication link 42a supported by the backplane 34 to the second state machine 24c residing on the second line card 20c.

To synchronize the first and second state machines 24b, 24c, the second update module 76b of the second state machine 24c may be designed to respond to the state message 94 received at the second virtual port 44b according to the ring protection protocol as though the state message 94 were received at the second ring port 22d. By responding to the state message 94 in this way, the second update module 76b may update 98 the second state machine 24c to the updated state. As a result, the first state machine 24b and the second state machine 24c may share a common state for the ring node 12d-2.

Another forwarding module 90b and/or switch infrastructure 48b at the second line card 20c may then forward the state message 94 to the front port 22d of the second line card 20c serving as a ring port 18d. The state message may then be forwarded to the next node 12e to facilitate the coordinated implementation of the ring protection protocol as if the ring node 12d-2 with multiple state machines 24b, 24c, was a ring node 12d-1 with one state machine 24a.

Synchronizing multiple state machines 24 over an inter-card communication link 42 with state messages 94 used to coordinate a ring protection protocol across multiple nodes 12a-f may lead to complications. For example, if there is a failure 100 of the inter-card communication link 42a, state messages 94, and other traffic can no longer be relayed across the ring node 12d-2. To address such a failure 100, a response may be required.

One or more monitoring modules 88 may monitor the inter-card communication link 42 from the first virtual port 44a of the first line card 20b over the backplane 34 to the second virtual port 44b of the second line card 20c for a failure 100. A monitoring module 88 may employ Continuity Check Messages (CCM), virtual port failure reports, and or other approaches to detect a failure somewhere along the inter-card communication link 42a.

In response to a failure 100 of the inter-card communication link 42a, as detected by a monitoring module 88, one or more internal-port blocking modules 78a, 78b for the first state machine 24b and/or the second state machine 24c may block 102, 104 a corresponding virtual port 44, the first virtual port 44a where an internal-port blocking module 78a belongs to the first state machine 24b and the second virtual port 44b where an internal-port blocking module 78b belongs to the second state machine 24c. Also, in response to the failure 100, the first update module 76a and the second update module 76b may, respectively update the first state machine 24b and the second state machine 24c from an idle state to a new common state reflecting the failure 100.

After closing 102, 104 the first virtual port 44a and/or the second virtual port 44b in response to the failure 100, one or more messaging modules 80a, 80b may send one or more failure messages 106a, 106b. A messaging module 80a, 80b on the first line card 20b and/or the second line card 20c may generate and send a failure message 106a, 106b out at least one of the two ring ports 18c, 18d of the ring node 12d-2. Such a failure message 106 may indicate a need to open 32 an RPL 14a blocked 16 to prevent a loop in a ring 10 of nodes 12a-f to which the ring node 12d-2 pertains.

A failure message 106 may be a message defined by the ring protection protocol to respond to a failure at a link 14 maintained between ring ports 18 of adjacent ring nodes 12 within a ring 10 defined by the ring protection protocol. For example, in examples where the ring protection protocol is consistent with ITU-T G.3082, a failure message 106 may be an R-APS Signal Fail (SF) message, R-APS(SF) message. Although directions of traffic may need to be altered, once the RPL 14a is unblocked 32, traffic can reach the various nodes 12a-f in the ring 10 despite the failure 100.

With the repair, or recovery 108, of the inter-card link 42 a potential for a loop may arise while the RPL 14a is unblocked 32. In averting this potential, transparency of the multiple state machines 24 may be achieved by differentiating roles played by the multiple state machines 24 in terms of their preventative actions. Thus, a set of master-role actions 82 may be performed by either the first state machine 24b or the second state machine 24c. Conversely, a set of slave-role actions 84 may be performed by a state machine 24b/24c not performing the set of master-role actions 82. The set of master-role actions 82 may be assigned to the first ring-protection-protocol state machine 24b or the second ring-protection-protocol state machine 24c according to a predetermined convention.

For example, the set of master-role actions 82 may be assigned to a state machine 24 associated with the highest slot value. Along these lines, the set of slave-role actions 84 may be assigned to a state machine 24 with the lowest value. Other conventions are possible, and the foregoing convention may be reversed. As can be appreciated, in examples consistent with FIG. 7, slot n 92b has the highest value and, therefore, the second state machine 24c would be assigned the set of master-role actions 82 according to the first convention. As used herein, the term set can include any number of elements and may include the null set.

The set of master-role actions 82 may include blocking 110 a ring port 18d corresponding to the state machine 24c to which the master-role actions 82 are assigned in response to a recovery 108 of the inter-card communication link 42b. To prevent a loop while the RPL 14a is unblocked 32, the set of master-role actions 82 may block 110 a front port 22d corresponding to a ring port 18d before an internal blocking module 78b unblocks 112 the corresponding virtual port 22d in response to the recovery 108 of the inter-card communication link 42b.

The messaging module 80b residing at the line card 20c with the state machine 24c assigned the set of master-role actions 82 may generate and send a link-up message 114 across the recovered inter-card communication link 42b to prompt a state machine 24b to unblock 116 a corresponding virtual port 44a at a remote end of the inter-card communication link 42b. In some examples, the messaging module 80b may generate the link-up message 114 after the blocking 110 of the corresponding ring port 18d. By way of example, and not limitation, the messaging module 80b may generate the link-up message 114 by setting a Type, Length, and Value (TLV) option field of a CCM message to a predefined value. In response to the link-up message 114, an internal-port blocking module 78a, residing at the line card 20b with the state machine 24b assigned the set of slave-role actions 84, may unblock 116 the corresponding virtual port 44a.

To return the ring 10 to a normal posture with its backup redundancy, in response to the recovery 108 of the inter-card communication link 14b, a messaging module 80a of the first state machine 24b and/or a messaging module 80b of the second state machine 24c may send a recovery message 118a, 118b out the first font port 22c serving as a first ring port 18c and/or the second front port 22d serving as the second ring port 18d respectively. A recovery message 118 may be defined by the ring protection protocol to respond to a recovery of a link 14 maintained between ring ports 18 of adjacent ring nodes 12a-f. For example, in examples where the ring protection protocol is consistent with ITU-T G.3082, the recovery message 106 may be an R-APS No Request (NR) message, R-APS(NR) message.

According to the ring protection protocol implemented by the ring 10, the RPL 14a may be blocked 16 in response to one or more recovery messages 118. However, to prevent a loop, an indication 120 that the RPL has been blocked 16 may be required before the switch protection module 74b/state machine 24c assigned the set of master-role actions 82 unblocks 122 the front port 22d serving as the corresponding ring port 18d. Furthermore, the indication 120 may vary depending on a previously assigned ring-level role of the ring node 12d-2.

For example, where the ring protection protocol assigns responsibility for maintaining an RPL 14a to the ring node 12d-2 as owner node (ORPL), as defined by the ring protection protocol for the protection ring 10 to which the ring node 12d-2 belongs, the switch protection module 74b/state machine 24c may wait for a restore clock 120a to expire. By way of example and not limitation, in some examples consistent with the ring protection protocol defined by ITU-T G.3082, the restore clock 120a may be a Wait To Restore (WTR) clock. After restoration of the restore clock 120a, in accordance with the master-role actions 82b, the switch protection protocol 74b/state machine 24c may unblock 122 the ring port 18d maintained by the line card 20c carrying the ring-protection-protocol state machine 24c assigned the set of master-role actions 82a.

Conversely, where the ring protection protocol assigns responsibility for maintaining an RPL 14a for a ring 10 to which the ring node 12d-2 belongs to another node 12a, as ORPL node, apart from the ring node 12d-2, the switch protection protocol 74b/state machine 24c may wait to receive a blocking message, or root-blocked message 120b, from the o ORPL node 12a. By way of example and not limitation, in some examples consistent with the ring protection protocol defined by ITU-T G.3082, the blocking message 120b may be an R-APS Root Blocked (RB) message, R-APS (RB) message. After receiving the blocking message 120b, in accordance with the master-role actions 82b, the switch protection protocol 74b/state machine 24c may unblock 122 the ring port 18d maintained by the line card 20c carrying the ring-protection-protocol state machine 24c assigned the set of master-role actions 82a.

Once the ring port 18d is unblocked 122, the first update module 76a and the second update module 76b may, respectively, update the first state machine 24b and the second state machine 24c from their previous common state back to a shared idle state. Hence, by waiting on an indication 120 that the ORPL node 12d-2/12a has blocked the RPL 14a before unblocking 122 the ring port 18d, another opportunity for a loop can be avoided. The following figure provides a brief overview of ways in which loops may be avoided where a ring node 12d-2 is implemented with multiple state machines 24.

Figure 8:
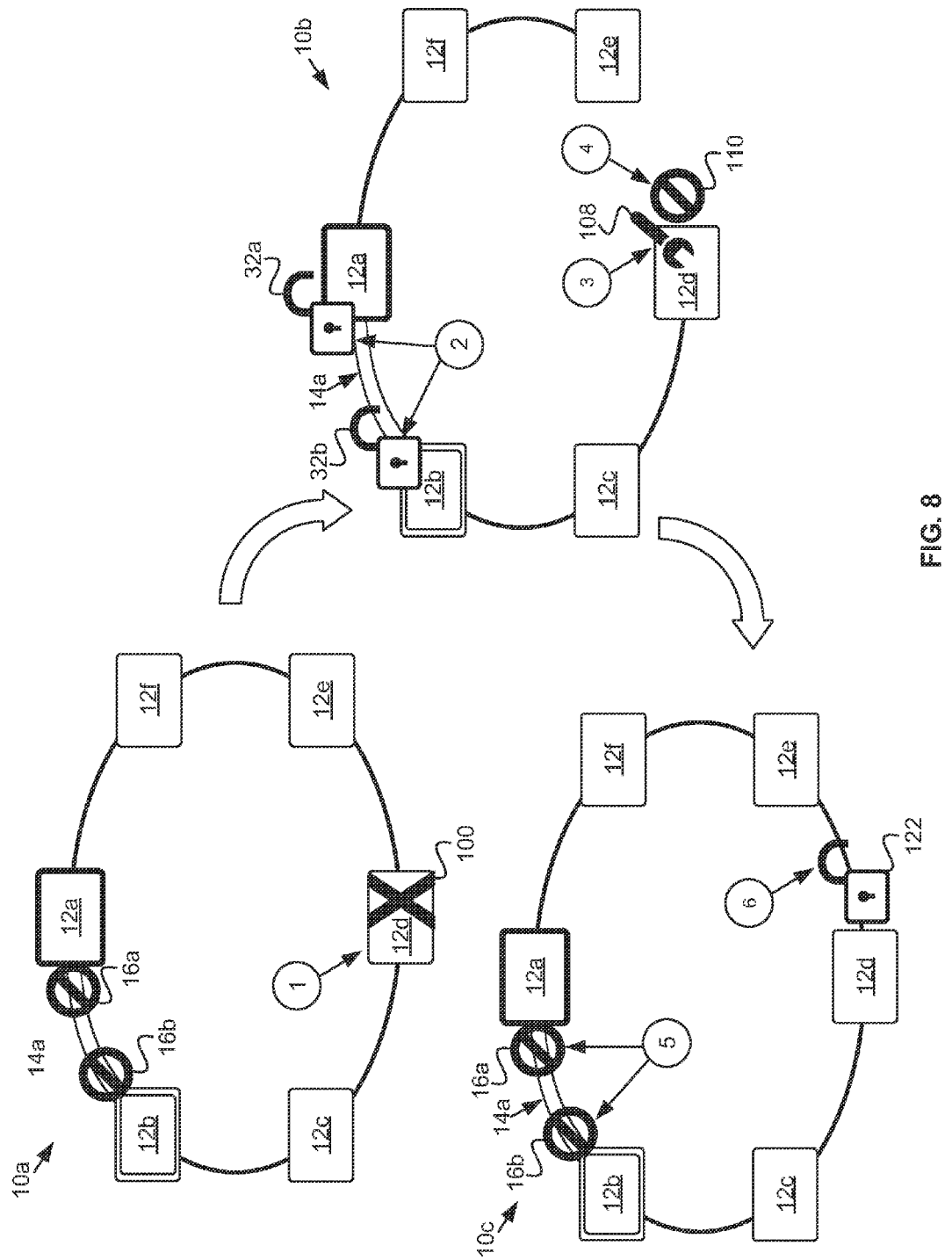
FIG. 8 is a schematic block diagram of a system progression for (1) a ring architecture implementing a ring protection protocol with a ring node experiencing a failure on an internal link between two state machines, progressing to (2) the ring node blocking a ring port to prevent a loop as the ring protection link for the ring is unblocked, and progressing to (3) the ring node unblocking the ring port after the ring protection link is blocked again, in accordance with an embodiment of the present invention.

Referring to FIG. 8, a ring protection system 10 progresses through various stages 10a-c to prevent various potential loops. In a first state 10a, the ring protection system 10 is depicted with the RPL 14a blocked 16, when a first event (1) occurs, namely a failure at 100 at an inter-card communication link 42 at a ring node 12d-2 that may be implementing multiple state machines 24 and may be utilizing the inter-card communication link 42 to transparently synchronize the multiple state machines 24. The ring protection system 10 may then progress to a second stage 10b at which the OPRL node 12a and/or the neighbor node 12b may have (2) unblocked 32 the RPL 14a, potentially in response to one or more failure messages 106, such that all links 12a-f in the ring can be accessed despite the failure 100.

However, at the second stage 10b, the inter-card communication link 42 may also (3) have been repaired 108, and in accordance with the set of master-role actions 82, the corresponding ring port 18d may (4) have been blocked 110 to prevent a loop. In the third stage 10c, potentially in response to one or more recovery messages 118, the OPRL node 12a and/or the neighbor node 12b may have (5) blocked 16 the RPL 14a. Nevertheless, the switch protection protocol 74b/state machine 24c implementing the set of master-role actions 82b may wait to (6) unblock 122 the ring port 18d until it has received an indication 120 from the ORPL node 12a that the RPL 14a has been blocked 16 to avoid the potential for a loop.

Figure 9:
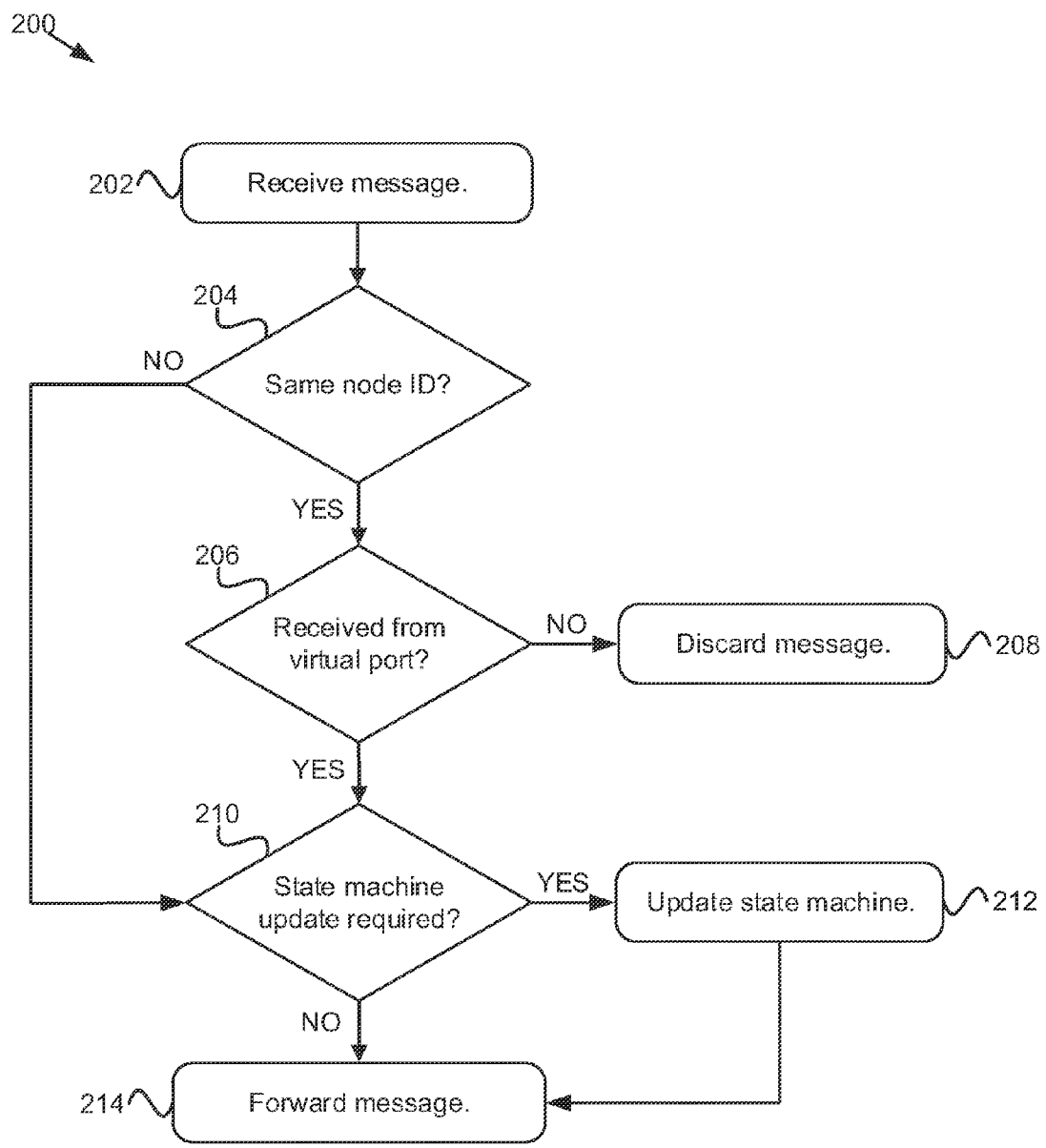
FIG. 9 is a flow chart of a method for determining whether to respond to a message with a node identification value matching that of a line card/slot receiving the message in an environment where the two ports of a ring node are maintained by two line cards/slots with a common node identification value, in accordance with an embodiment of the present invention.
Figure 10:
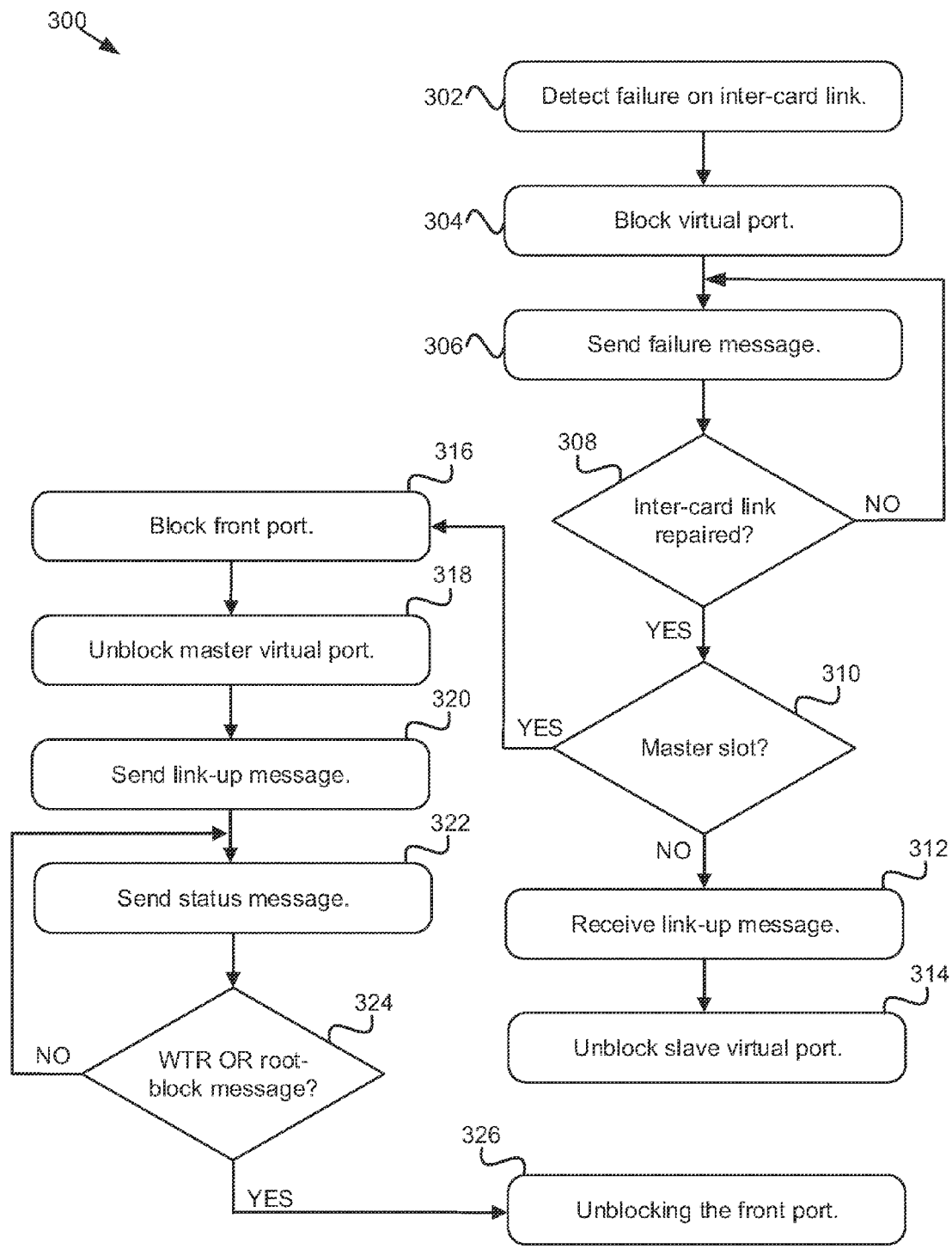
FIG. 10 is a flow chart of a method for (1) responding to failures on a link between multiple state machines at a common ring node and (2) preventing a loop after the previously failed link is recovered, in accordance with an embodiment of the present invention.

The flowcharts in FIGS. 9 and 10 illustrate the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

It should also be noted that, in some alternative implementations, the functions noted in the blocks may occur out of the order noted in the figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

Referring to FIG. 9, a method 200 is depicted for determining whether to respond to a state message 94. In some ring protection protocols, messages 94 with a node identification value matching that of a line card 20 receiving the message 94, indicating that they may have completed their circuit of the ring 10 back to their origin, may be discarded. However, in an environment where the two ports 18c, 18d of a ring node 12d-2 are maintained by two line cards 20b, 20c, those line cards 20b, 20c may share a common node identification value to assist in making them transparent. Therefore, the presence of a common node identification value may occur from a paired line card 20b/20c and may be important to synchronizing the pair of line cards 20b, 20c, as opposed to an indication that a message 94 has run its course. Therefore, the method 200 provides some examples of how a determination to respond to a message 94 in such an environment may be made.

The method 200, which may be implemented with a preservation module 86, may include receiving 200 a message 94. A determination 204 may be made as to whether the message 94 has the same node identification value as the line card 20 receiving the message 94. If the answer is NO, an update module 76 may make a determination 210 as to whether an update to the state machine 24 is required in light of the message 94.

Conversely, if the answer is YES, the message 94 is a matched message 94, which may be defined as a message 94 carrying a node identification value assigned to a node 12 providing the message 94 that matches a node identification value assigned to the line card 20 receiving the message 94. For a matched message 94, a determination 206 may be made as to whether the message 94 was received from a corresponding virtual port 44. If the answer is NO, the message 94 may be discarded 208. In other words, if a matched message 94 arrives at the corresponding ring port 18, the preservation module 86 may allow the matched message 94 to be discarded 208 without a response from the state machine 24.

However, if the answer to the determination 206 is YES, the method 200 may proceed to the determination 210 as to whether an update to the state machine 24 is required in light of the message 94. Regardless of the scenario under which the determination 210 is reached as to whether an update is required, the method 200 may 212 update the state machine 24 if the answer is YES. If the answer is NO, the method 200 may forward 214 the message 94. In other words, the preservation module 86 may preserve the matched message 94 received at the virtual port 44 so that the update module 76 of the corresponding state machine 24 may determine whether 210 whether to update 212 the state machine 24 in response to the matched message 94.

Referring to FIG. 10, a method 300 is depicted that (1) responds to a failure 100 on a link 42 that may be utilized to synchronize multiple state machines 24 residing at a common ring node 12. The method 300 may also (2) prevent one or more loops after the previously failed link 42 is recovered 108. The method 300 may include detecting 302 a failure 100 on the inter-card link 42 and blocking 304 one or more virtual ports 44 on either end of the link 42 in response. Additionally, the method 300 may involve sending 306 one or more signal failure messages 106 to coordinate implementation of the ring protection protocol within the corresponding ring 10.

After monitoring the failed inter-card communication link 42, which may be performed in some examples, from a first virtual port 44a of the first line card 24b over the backplane 34 to the second virtual port 44b of the second line card 20b for a recovery 108, a determination 308 may be made as to whether a recovery 108 may have occurred. If the answer is NO, the method 300 may return to sending 306 one or more fail messages 106 then, once again, to the recovery determination 308. If the answer is YES, the method 300 may proceed to a determination 310 as to whether or not the method 300 is being implemented on a slot 92 at which the set of master-role actions 82 has been assigned.

If the answer is NO, the method may wait to receive 312 a link-up message 114. Upon receiving the link-up message 114, the corresponding virtual port 44 may be unblocked 314/116. If the answer is YES, the method 300 may proceed by blocking 316/110 a front port 22 serving as a ring port 18 maintained by the line card 20 with the ring-protection-protocol state machine 24 assigned the set of master-role actions 82 upon detecting the recovery 108, or shortly thereafter. The blocking 316/110 of a ring port 18 in response to a recovery 108 of the intra-node link 42 after a previous failure 100 may belong to the set of master-role actions 82 assigned to a given state machine 24.

After the unblocking 316/110 step, the method 300 may proceed by unblocking 318/112 a corresponding virtual port 44 and sending 320 the link-up message 114 received 3312 at the other paired line card 20 at step 312. A status, or recovery, message 118 may also be sent 322 to prompt a re-blocking 16 of the RPL 14a. A determination 324 can also be made as to whether an indication 120 of re-blocking 16 obtains, which may be expiration of a restoration timer 120a where the method 300 is implemented on an ORPL node 12 and which may be the reception of a root-block message 120b where the method 300 is not.

If the answer is NO, the method 300 may circle back to sending 322 the status/recovery message 118 and to the RPL-indication determination 324. If the answer is YES, the method 300 may proceed to unblocking 326/122 the front port 22 serving as a ring port 18, responding to the indication 120 that the RPL 14a for a network ring 10 in which the corresponding state machine 24 participates has been restored 32.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A redundant ring node comprising:
   a first line card used to implement a ring node, the first line card comprising:
      a first front port serving as a first ring port of two ring ports defined for ring nodes supporting a ring protection protocol, and
      a first state machine implementing a state machine consistent with the ring protection protocol;
   a second line card used to implement the ring node, the second line card comprising:
      a second front port serving as a second ring port of the two ring ports defined for ring nodes supporting the ring protection protocol, and
      a second state machine also implementing a state machine consistent with the ring protection protocol; and
   a backplane providing communication infrastructure between multiple line cards residing at the ring node;
   an inter-card communication link implemented over the backplane between a first virtual port at the first line card and a second virtual port at the second line card;
   a first update module of the first state machine operable to update the first state machine according to the ring protection protocol and in response to a state message arriving at the first ring port;
   a forwarding module residing on the first line card and operable to forward the state message through the first virtual port and over the inter-card communication link supported by the backplane to the second state machine residing on the second line card; and
   a second update module of the second state machine operable to respond to the state message received at the second virtual port according to the ring protection protocol as though the state message were received at the second ring port so that the second update module updates the second state machine to the updated state such that the first state machine and the second state machine share a common state for the ring node.

2. The redundant ring node of claim 1, wherein at least one of the first state machine and the second state machine include an internal-port blocking module operable to at least one of:
   block a corresponding virtual port, the corresponding virtual port being the first virtual port where the internal-port blocking module pertains to the first state machine and the second virtual port where the internal-port blocking module pertains to the second state machine, in response to a failure of the inter-card communication link; and
   unblock the corresponding virtual port in response to at least one of:
      a recovery of the inter-card communication link, and
      a link-up message.

3. The redundant ring node of claim 1, further comprising a messaging module for at least one of the first state machine and the second state machine operable to at least one of:
   send a failure message out a corresponding ring port, the corresponding ring port being the first ring port where the messaging module pertains to the first state machine and the second ring port where the messaging module pertains to the second state machine, the failure message defined by the ring protection protocol to respond to a failure at a link maintained between ring ports of adjacent ring nodes within a ring defined by the ring protection protocol, in response to a failure at the inter-card communication link; and
   send a recovery message out the corresponding ring port, the recovery message defined by the ring protection protocol to respond to a recovery of a link maintained between ring ports of adjacent ring nodes, in response to a recovery of the inter-card communication link.

4. The redundant ring node of claim 1, further comprising:
   a set of master-role actions performed by one of the first state machine and the second state machine; and
   a set of slave-role actions performed by the one of the first state machine and the second state machine not performing the set of master-role actions.

5. The redundant ring node of claim 4, wherein the set of master-role actions comprises blocking a corresponding ring port in response to a recovery of the inter-card communication link, the corresponding ring port being the first ring port where the set of master-role actions is performed by the first state machine and the second ring port where the set of master-role actions is performed by the second state machine.

6. The redundant ring node of claim 5, wherein the set of master-role actions further comprises:
   unblocking the corresponding ring port in response to one of:
      expiration of a recovery timer where the ring node is an owner node responsible for a ring protection link as defined by the ring protection protocol, and
      receipt of a root-blocked message where the ring node is not an owner node; and
   sending a link-up message over the inter-card communication link after blocking the corresponding ring port to prompt a state machine to unblock a corresponding virtual port at a remote end of the inter-card communication link.

7. The redundant ring node of claim 1, further comprising at least one additional line card residing at the ring node with at least one front port linked to a client node outside of a ring to which the ring node belongs, the additional line card communicatively coupled to both the first line card and the second line card over the backlink.

8. A redundant ring node comprising:
   a first line card used to implement a ring node, the first line card comprising:
      a first front port serving as a first ring port of two ring ports defined for ring nodes supporting a ring protection protocol, and a first state machine implementing a state machine consistent with the ring protection protocol;
a second line card used to implement the ring node, the second line card comprising:
a second front port serving as a second ring port of the two ring ports defined for ring nodes supporting the ring protection protocol, and
a second state machine also implementing a state machine consistent with the ring protection protocol; and
a backplane providing communication infrastructure between multiple line cards residing at the ring node
a preservation module residing at the second line card and operable to:
preserve a first matched message received at the second virtual port so that a second update module pertaining to the second state machine can determine whether to updated the second state machine in response to the first matched message, where a matched message is defined as a message carrying a node identification value assigned to a node providing the message that matches a node identification value assigned to the second line card; and
allow a second matched message to be discarded without a response from the second state machine where the second matched message arrives at the second ring port.

9. A method for implementing a redundant node supporting a ring protection protocol comprising:
implementing a ring-protection-protocol state machine on each of two different line cards residing at a ring node supporting a ring protection protocol, a front port of each line card providing one of two ring ports defined for the ring node by the ring protection protocol;
updating a first ring-protection-protocol state machine on a first line card of the two line cards to an updated state;
passing a message from a first virtual port of the first line card over a backplane of the ring node to a second virtual port of the second line card; and
updating a second ring-protection-protocol state machine on the second line card of the two line cards to the updated state in response to the message received at the second virtual port such that the first state machine and the second state machine are synchronized as a common virtual state machine with respect to the ring node;
monitoring an inter-card communication link from the first virtual port of the first line card over the backplane to the second virtual port of the second line card for a failure;
closing at least one of the first virtual port and the second virtual port in response to a failure; and
sending a failure message out at least one of the two ring ports of the ring node, the failure message indicating a need to open a ring protection link blocked to prevent a loop in a ring of nodes to which the ring node pertains.

10. The method of claim 9 further comprising assigning a set of master-role actions to one of the first ring-protection-protocol state machine and the second ring-protection-protocol state machine.

11. The method of claim 10 further comprising:
monitoring a failed inter-card communication link from the first virtual port of the first line card over the backplane to the second virtual port of the second line card for a recovery; and
blocking a ring port maintained by a line card with a ring-protection-protocol state machine assigned the set of master-role actions upon detecting the recovery; and
unblocking a virtual port of the line card with the first ring-protection-protocol state machine assigned the set of master-role actions after blocking the ring port.

12. The method of claim 11, further comprising
assigning responsibility for maintaining a ring protection link for a protection ring to which the ring node belongs to the ring node as owner node;
waiting for a restore clock to expire;
unblocking the ring port maintained by the line card carrying the ring-protection-protocol state machine assigned the set of master-role actions after expiration of the restore clock.

13. The method of claim 11 further comprising:
assigning responsibility for maintaining a ring protection link for a ring to which the ring node belongs to an owner node to another node apart from the ring node;
receiving a blocking message from the owner node; and
unblocking the ring port maintained by the line card carrying the ring-protection-protocol state machine assigned the set of master-role actions.

14. A method for implementing a redundant node supporting a ring protection protocol comprising:
implementing a ring-protection-protocol state machine on each of two different line cards residing at a ring node supporting a ring protection protocol, a front port of each line card providing one of two ring ports defined for the ring node by the ring protection protocol;
updating a first ring-protection-protocol state machine on a first line card of the two line cards to an updated state;
passing a message from a first virtual port of the first line card over a backplane of the ring node to a second virtual port of the second line card;
updating a second ring-protection-protocol state machine on the second line card of the two line cards to the updated state in response to the message received at the second virtual port such that the first state machine and the second state machine are synchronized as a common virtual state machine with respect to the ring node; and
redirecting traffic previously passing through a ring port of the ring node maintained by a failed line card to pass through a remaining ring port of the two ring ports defined for the ring node under ring protection control provided by a surviving state machine residing on a surviving line card maintaining the remaining ring port and then to pass across the backplane of the ring node and out an additional front port of the ring node to a client node external to a ring of nodes to which the ring node pertains.

* * * * *